(12) United States Patent
Nikolaev et al.

(10) Patent No.: US 10,081,122 B2
(45) Date of Patent: Sep. 25, 2018

(54) STATIC MIXER FOR INJECTION MOLDING MACHINE

(71) Applicant: Athena Automation Ltd., Vaughan (CA)

(72) Inventors: Ivan Nikolaev, Richmond Hill (CA); Stephen Mracek, Oakville (CA); Robert D. Schad, Toronto (CA)

(73) Assignee: ATHENA AUTOMATION LTD., Vaughan (CA)

( * ) Notice: Subject to any disclaimer, the term of this patent is extended or adjusted under 35 U.S.C. 154(b) by 314 days.

(21) Appl. No.: 15/042,437

(22) Filed: Feb. 12, 2016

(65) Prior Publication Data

US 2016/0236389 A1    Aug. 18, 2016

Related U.S. Application Data

(60) Provisional application No. 62/115,306, filed on Feb. 12, 2015.

(51) Int. Cl.
| | | |
|---|---|---|
| B29C 45/58 | (2006.01) | |
| B29C 45/20 | (2006.01) | |
| B29K 105/00 | (2006.01) | |
| B29C 45/30 | (2006.01) | |

(52) U.S. Cl.
CPC ............ B29C 45/581 (2013.01); B29C 45/20 (2013.01); *B29C 2045/308* (2013.01); *B29K 2105/0058* (2013.01)

(58) Field of Classification Search
CPC ............ B29C 2045/308; B29C 45/581; B29C 47/362; B01F 5/0614; B01F 5/0615; F15D 1/02
See application file for complete search history.

(56) References Cited

U.S. PATENT DOCUMENTS

| | | |
|---|---|---|
| 3,106,746 A | 10/1963 | Sunday |
| 3,128,794 A * | 4/1964 | Boucher ................... F15D 1/02 137/1 |
| 3,609,806 A | 5/1969 | Schippers et al. |
| 4,150,932 A | 4/1979 | Moghe |
| 4,541,982 A | 9/1985 | Upmeier |
| 5,811,048 A | 9/1998 | Dunn et al. |
| 7,198,400 B2 | 4/2007 | Unterlander et al. |

FOREIGN PATENT DOCUMENTS

| | | |
|---|---|---|
| CN | 102990852 | 3/2013 |
| GB | 891212 | * 3/1962 |

* cited by examiner

*Primary Examiner* — Jill L Heitbrink
(74) *Attorney, Agent, or Firm* — Bereskin & Parr LLP/S.E.N.C.R.L., s.r.l.

(57) ABSTRACT

A static mixer for an injection molding machine comprises a plate having an inlet face, an axially opposed outlet face, and a longitudinal axis extending therebetween. A plurality of bores extend through the plate from the inlet face to the outlet face. Each bore extends along a bore axis that is inclined relative to the longitudinal axis. The inlet face comprises an inlet face peripheral portion and an inlet face central portion. The outlet face comprises an outlet face peripheral portion, and an outlet face central portion. A core extends longitudinally between the inlet face central portion and the outlet face central portion.

22 Claims, 4 Drawing Sheets

STATIC MIXER FOR INJECTION MOLDING MACHINE

CROSS-REFERENCE TO RELATED APPLICATIONS

This application claims the benefit of United States Provisional Application No. 62/115,306, entitled "STATIC MIXER FOR INJECTION MOLDING MACHINE", filed Feb. 12, 2015, the entire contents of which are hereby incorporated by reference.

FIELD

The disclosure relates to injection molding and injection molding machines. More specifically, the disclosure relates to static mixers positionable in an injection nozzle of an injection molding machine, to mix, blend, shear, and/or homogenize material passing through the nozzle.

BACKGROUND

U.S. Pat. No. 4,150,932 (to Moghe) purports to disclose an aramid fiber reinforced hose having the fiber in discrete particles extruded with the elastomer to provide orientation of the aramid fibers in two oppositely helical overlapping directions. A strainer plate is located within the extruder that has a series of apertures on concentric circles with each series of apertures extending through the plate at opposite helical directions.

U.S. Pat. No. 5,811,048 (to Dunn et al.) purports to disclose a method and apparatus for homogenizing a flow stream of plasticized material supplied from an extruder, to reduce viscosity gradients causing defects in extruded products. A flow inverting homogenizer is positioned in the flow stream and incorporates a plurality of criss-crossing channels for simultaneously transferring portions of the flow stream from central to peripheral flow stream locations and other portions of the flow stream from peripheral to central flow stream locations.

U.S. Pat. No. 4,541,982 (to Upmeier) purports to disclose a passage for transferring molten plastic material processed in an extruder. The passage contains distributing elements for dividing the molten stream into partial streams and for recombining said partial streams in a different relation to each other. In order to minimize boundary layer faults which result from the distribution of the partial streams, the molten stream is divided into partial streams by at least one annular distributing disc, which is provided on its entrance side with an annular series of openings, and in which adjacent ones of said openings are succeeded by bores which extend radially outwardly and radially inwardly, respectively, so that the molten stream is divided into sectorlike partial streams which are conducted radially inwardly and radially outwardly, respectively, in adjacent bores and are then recombined.

SUMMARY

The following summary is intended to introduce the reader to various aspects of the applicant's teaching, but not to define any invention.

According to one aspect, a static mixer for an injection molding machine comprises a plate having an inlet face, an axially opposed outlet face, and a longitudinal axis extending therebetween. A plurality of bores extends through the plate from the inlet face to the outlet face. Each bore extends along a bore axis. The bore axis is inclined relative to the longitudinal axis. The inlet face comprises an inlet face peripheral portion at a first axial position, and an inlet face central portion at a second axial position spaced from the first axial position. The outlet face comprises an outlet face peripheral portion at a third axial position, and an outlet face central portion at a fourth axial position spaced from the third axial position. The plate has a core extending longitudinally between the inlet face central portion and the outlet face central portion. Each bore is spaced radially outwardly from the core.

In some examples, the inlet face may comprise an inlet face annular recess radially intermediate the inlet face peripheral portion and the inlet face central portion. Each bore may have a bore inlet open to the inlet face annular recess. The outlet face may comprise an outlet face annular recess radially intermediate the outlet face peripheral portion and the outlet face central portion. Each bore may have a bore outlet open to the outlet face annular recess.

In some examples, the second axial position may be spaced from the first axial position in a direction of material flow, and the fourth axial position may be spaced from the third axial position in the direction of material flow. The third axial position may be spaced from the second axial position in the direction of material flow.

In some examples, the bores are arranged in a first ring around the longitudinal axis, and a concentric second ring around the longitudinal axis. The bore axes of the first ring may be inclined at a first angle relative to the longitudinal axis, and the bore axes of the second ring may be inclined at a second angle relative to the longitudinal axis. The second angle may be different from the first angle.

In some examples, the inlet face central portion and the inlet face peripheral portion may be generally planar and orthogonal to the longitudinal axis. The outlet face central portion and the outlet face peripheral portion may be generally planar and orthogonal to the longitudinal axis.

In some examples, the inlet face central portion may be generally pointed. In some examples, the outlet face central portion may be generally pointed.

In some examples, the bores may be arranged so that flow through one of the first ring and the second ring is generally helical and in a counter-clockwise direction, and flow through the other of the first ring and the second ring is generally helical and in a clockwise direction. The bores may be arranged so that the bores of the first ring direct flow radially outwardly, and the bores of the second ring direct flow radially inwardly. The bores of the second ring may be radially outward of the bores of the first ring. The bores of the first ring may direct flow in a first circumferential direction, and the bores of the second ring may direct flow in a second circumferential direction opposite the first circumferential direction.

According to another aspect, a static mixer for an injection molding machine comprises a plate having an inlet face, an axially opposed outlet face, and a longitudinal axis extending therebetween. The inlet face comprises an inlet face annular recess, and the outlet face comprises an outlet face annular recess. A plurality of bores extends through the plate. Each bore extends along a bore axis between a bore inlet open to the inlet face annular recess and a bore outlet open to the outlet face annular recess. The bore axis is inclined relative to the longitudinal axis.

In some examples, the inlet face may comprise an inlet face peripheral portion, and an inlet face central portion. The inlet face annular recess may be radially intermediate the inlet face peripheral portion and the inlet face central portion. The inlet face central portion and the inlet face peripheral portion may be generally planar and orthogonal to the longitudinal axis.

In some examples, the outlet face may comprise an outlet face peripheral portion, and an outlet face central portion. The outlet face annular recess may be radially intermediate the outlet face peripheral portion and the outlet face central portion. The outlet face central portion and the outlet face peripheral portion may be generally planar and orthogonal to the longitudinal axis.

In some examples, the bores may be arranged in a first ring around the longitudinal axis, and a concentric second ring around the longitudinal axis. The bore axes of the bores of the first ring may be inclined at a first angle relative to the longitudinal axis, and the bore axes of the bores of the second ring may be inclined at a second angle relative to the longitudinal axis. The second angle may be different from the first angle.

According to another aspect, a static mixer assembly for an injection molding machine comprises at least a first plate and a second plate. Each plate has an inlet face, an axially opposed outlet face, and a longitudinal axis extending therebetween. The first plate and the second plate are stacked coaxially with the outlet face of the first plate adjacent the inlet face of the second plate. The outlet face of the first plate comprises an outlet face annular recess, and the inlet face of the second plate comprises an inlet face annular recess. The outlet face annular recess and the inlet face annular recess are positioned adjacent each other and cooperate to form an annular chamber between the first plate and the second plate. A first plurality of bores extends through the first plate from the inlet face of the first plate to the outlet face of the first plate. A second plurality of bores extends through the second plate from the inlet face of the second plate to the outlet face of the second plate. The first plurality of bores each have a bore outlet open to the outlet face annular recess, and the second plurality of bores each have a bore inlet open to the inlet face annular recess, so that the first plurality of bores and the second plurality of bores are in fluid communication with the annular chamber.

In some examples, the inlet face of the second plate may comprise an inlet face peripheral portion and an inlet face central portion. The inlet face annular recess may be radially intermediate the inlet face peripheral portion and the inlet face central portion.

In some examples, the outlet face of the first plate may comprise an outlet face peripheral portion and an outlet face central portion. The outlet face annular recess may be radially intermediate the outlet face peripheral portion and the outlet face central portion.

In some examples, the inlet face peripheral portion may abut the outlet face peripheral portion. The inlet face central portion may abut the outlet face central portion.

In some examples, the inlet face peripheral portion may be at a first axial position, and the inlet face central portion may be at a second axial position spaced from the first axial position. The outlet face peripheral portion may be at a third axial position, and the outlet face central portion may be at a fourth axial position spaced from the third axial position.

In some examples, the second axial position may be spaced from the first axial position in a direction of material flow, and the fourth axial position may be spaced from the third axial position in the direction of material flow. The third axial position may be spaced from the second axial position in the direction of material flow.

In some examples, each of the first plate and the second plate may comprise a core extending longitudinally between the inlet face thereof and the outlet face thereof. The core of the second plate may be aligned with and abut the core of the first plate. The first plurality of bores may be spaced radially outwardly from the core of the first plate, and the second plurality of bores may be spaced radially outwardly from the core of the second plate.

According to another aspect, a static mixer assembly for an injection molding machine comprises at least a first plate and a second plate. Each plate has an inlet face, an axially opposed outlet face, and a longitudinal axis extending therebetween. The first plate and the second plate are stacked coaxially with the outlet face of the first plate adjacent the inlet face of the second plate. A first plurality of bores extends through the first plate from the inlet face of the first plate to the outlet face of the first plate, and a second plurality of bores extends through the second plate from the inlet face of the second plate to the outlet face of the second plate. The inlet face of the second plate has an inlet face peripheral abutment surface at a first axial position, and an inlet face central abutment surface at a second axial position spaced from the first axial position. The outlet face of the first plate has an outlet face peripheral abutment surface abutting the inlet face peripheral abutment surface, and an outlet face central abutment surface abutting the inlet face central abutment surface.

In some examples, the first plate may comprise a first core extending longitudinally between the inlet face thereof and the outlet face central abutment surface. The second plate may comprise a second core extending longitudinally between the outlet face thereof and the inlet face central abutment surface. The first plurality of bores may be spaced radially outwardly from the first core, and the second plurality of bores may be spaced radially outwardly from the second core.

In some examples, the outlet face of the first plate may comprise an outlet face annular recess radially intermediate the outlet face peripheral abutment surface and the outlet face central abutment surface. Each bore of the first plurality of bores may have a bore outlet open to the outlet face annular recess.

In some examples, the inlet face of the second plate may comprise an inlet face annular recess radially intermediate the inlet face peripheral abutment surface and the inlet face central abutment surface. Each bore of the second plurality of bores may have a bore inlet open to the inlet face annular recess.

In some examples, the inlet face annular recess and outlet face annular recess are positioned adjacent each other and cooperate to form an annular chamber between the first plate and the second plate.

In some examples, the second axial position is spaced from the first axial position in a direction of material flow.

In some examples, the inlet face peripheral abutment surface, inlet face central abutment surface, outlet face peripheral abutment surface, and outlet face central abutment surface may be generally planar and orthogonal to the longitudinal axis.

According to another aspect, a static mixer assembly for an injection molding machine comprises at least a first plate and a second plate. Each plate has an inlet face, an axially opposed outlet face, and a longitudinal axis extending therebetween. The first plate and the second plate are stacked coaxially with the outlet face of the first plate adjacent the inlet face of the second plate. A first plurality of bores extends through the first plate from the inlet face of the first plate to the outlet face of the first plate, and a second plurality of bores extends through the second plate from the inlet face of the second plate to the outlet face of the second plate. The first plurality of bores is in fluid communication with the second plurality of bores. The first plate has a first core extending longitudinally between the inlet face thereof and the outlet face thereof, and the second plate has a second core extending longitudinally between the inlet face thereof and the outlet face thereof. The first plurality of bores is spaced radially outwardly from the first core, and the second plurality of bores is spaced radially outwardly from the second core. The first core is coaxial with and abuts the second core.

In some examples, the outlet face of the first plate may comprise an outlet face peripheral portion, an outlet face central portion, and an outlet face annular recess therebetween. The first core may extend longitudinally from the outlet face central portion.

In some examples, each bore of the first plurality of bores may have a bore outlet in fluid communication with the outlet face annular recess.

In some examples, the outlet face peripheral portion and the outlet face central portion may be generally planar and orthogonal to the longitudinal axis.

In some examples, the first core may be axially offset from the outlet face peripheral portion.

In some examples, the inlet face of the second plate may comprise an inlet face peripheral portion, an inlet face central portion, and an inlet face annular recess therebetween. The second core may extend longitudinally from the inlet face central portion.

In some examples, each bore of the second plurality of bores may have a bore inlet in fluid communication with the inlet face annular recess.

In some examples, the second core may be axially offset from the inlet face peripheral portion.

In some examples, the first core and the second core may both be axially offset in a direction of material flow.

In some examples, the inlet face peripheral portion and the inlet face central portion may be generally planar and orthogonal to the longitudinal axis.

According to another aspect, a static mixer for an injection molding machine comprises a plate having an inlet face, an opposed outlet face, and a longitudinal axis extending therebetween. A plurality of bores extends through the plate from the inlet face to the outlet face. The inlet face comprises an inlet face peripheral portion, and an inlet face central portion. The outlet face comprises an outlet face peripheral portion, and an outlet face central portion. At least one of the inlet face central portion and the outlet face central portion may be generally pointed.

In some examples, the outlet face central portion may be generally pointed, and the inlet face central portion may be generally planar and orthogonal to the longitudinal axis In some examples, the inlet face central portion may be generally pointed, and the outlet face central portion may be generally planar and orthogonal to the longitudinal axis.

In some examples, both the inlet face central portion and the outlet face central portion may be generally pointed.

In some examples, the inlet face may comprise an inlet face annular recess radially intermediate the inlet face peripheral portion and the inlet face central portion.

In some examples, the outlet face may comprise an outlet face annular recess radially intermediate the outlet face peripheral portion and the outlet face central portion.

In some examples, the inlet face peripheral portion and outlet face peripheral portion may be generally planar and orthogonal to the longitudinal axis.

According to another aspects, a static mixer for an injection molding machine comprises: (a) a plate having an inlet face, an axially opposed outlet face, and a longitudinal axis extending between the inlet face and the outlet face; (b) a plurality of radially inner bores extending through the plate for directing flow of material radially outwardly, each inner bore having an inner bore inlet open to the inlet face and an inner bore outlet open to the outlet face and offset radially outwardly from the inner bore inlet; and (c) a plurality of radially outer bores extending through the plate for directing flow of material radially inwardly, each outer bore having an outer bore inlet open to the inlet face and an outer bore outlet open to the outlet face and offset radially inwardly from the inner bore inlet, the outer bore outlets arranged radially outward of the inner bore outlets.

In some examples, each inner bore outlet may be offset from a respective inner bore inlet in a first circumferential direction for directing flow of material in the first circumferential direction. Each outer bore outlet may be offset from a respective outer bore inlet in a second circumferential direction opposite the first circumferential direction for directing flow of material in the second circumferential direction.

In some examples, the inner bores may be arranged in a first ring about the axis, and the outer bores may be arranged in a second ring about the axis, the second ring concentric with and radially outward of the first ring.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Figure 1:
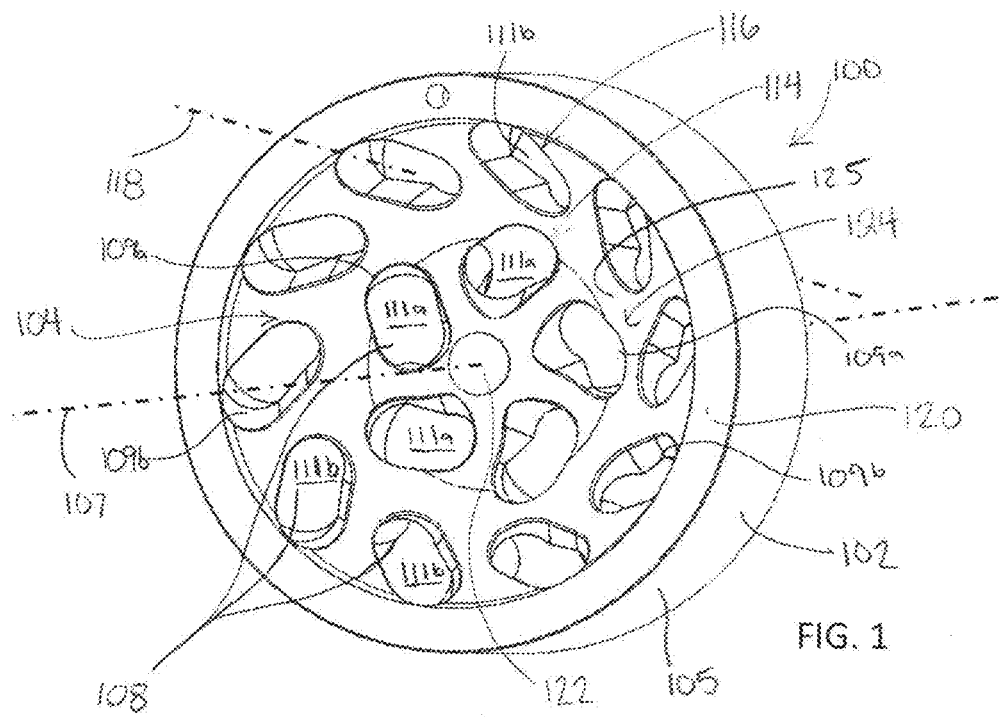
FIG. 1 is a front perspective view of an example static mixer, showing an inlet face of the static mixer.
Figure 2:
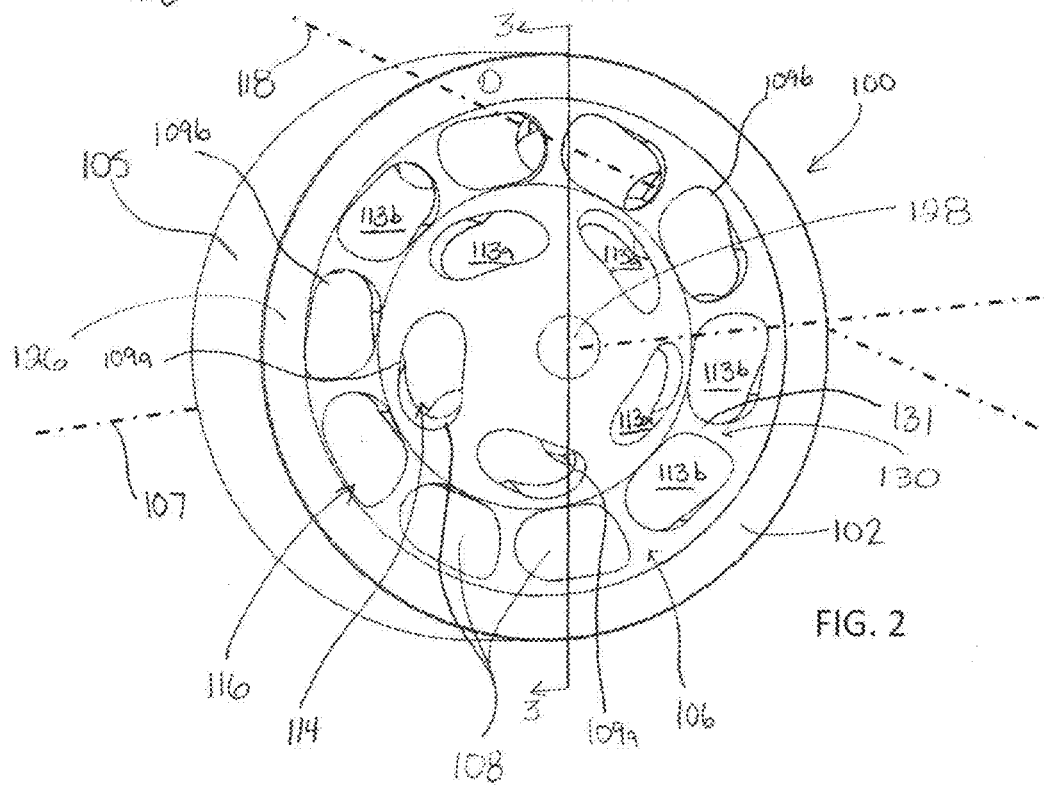
FIG. 2 is a rear perspective view of the static mixer of FIG. 1, showing an outlet face of the static mixer
Figure 3:
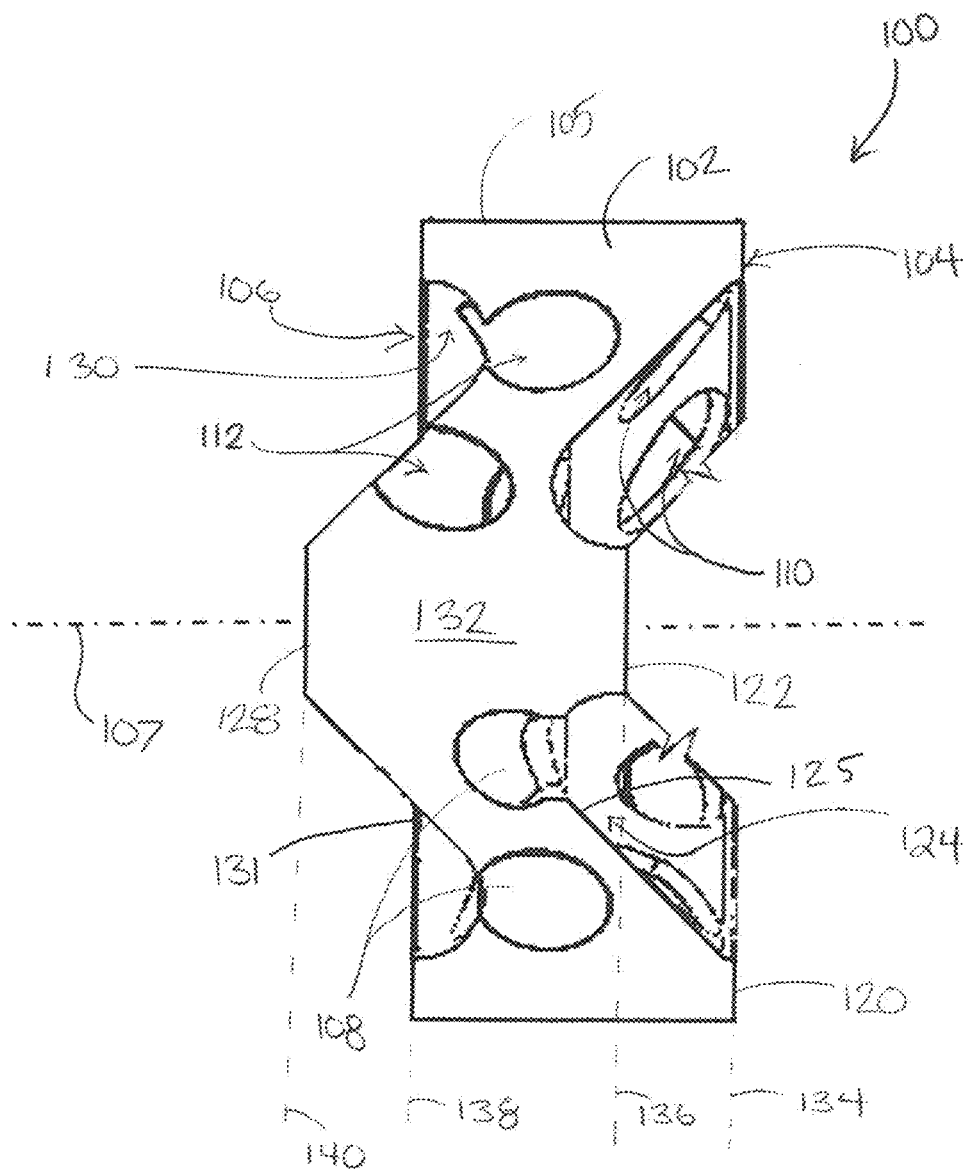
FIG. 3 is a partial cross-section taken along line 3-3 in FIG. 2.

Referring to FIGS. 1 to 3, an example static mixer 100 is shown. The static mixer 100 may, for example, be installed in an injection unit of an injection molding machine, for example, in the barrel or injection nozzle, and may serve to mix, blend, shear, and/or homogenize material, such as melted plastic, passing therethrough from the nozzle into a mold of the injection molding machine.

Referring still to FIGS. 1 to 3, in the example shown, the static mixer 100 includes a plate 102. The plate 102 has a generally circular shape in the example illustrated.

The plate 102 has an inlet face 104, an axially opposed outlet face 106, and a generally cylindrical side face 105 extending therebetween. In use, material enters the static mixer via the inlet face 104, and leaves the static mixer from the outlet face 106. A longitudinal axis 107 extends between the inlet face 104 and the outlet face 106. The axis 107 is generally parallel to the general direction of material flow passing through the static mixer 100.

Referring still to FIGS. 1 to 3, in the example shown, material passes through the static mixer 100 via a plurality of bores 108 in the plate 102 (for simplicity, only some of the bores are labelled in the Figures). Each bore 108 extends through the plate 102 from the inlet face 104 to the outlet face 106. Each bore has a bore inlet 110 open to the inlet face 104, and a bore outlet 112 open to the outlet face 106. Referring to FIGS. 1 and 2, in the example illustrated, the plurality of bores 108 comprises a plurality of radially inner bores 109a and a plurality of radially outer bores 109b.

In the example shown, the inner bores 109a are arranged in a first ring 114 about the longitudinal axis 107, and the outer bores 109b are arranged in a second ring 116 around the longitudinal axis 107. The second ring 116 is concentric with the first ring 114, and is radially outward of the first ring 114, in the example illustrated.

Each bore 108 may extend from the inlet face 104 to the outlet face 106 along a respective bore axis 118. The bore axes 118 may be inclined with respect to the longitudinal axis 107. In the example shown, the bore axes 118 are inclined so that, for a given bore, the bore outlet 112 is radially offset from the bore inlet 110.

In the example illustrated, the bore axis of each inner bore 109a is inclined at a first angle relative to the longitudinal axis 107, and the bore axis of each outer bore 109b is inclined at a second angle relative to the longitudinal axis 107. The second angle is different from the first angle. In the example illustrated, the plurality of inner bores 109a direct flow of material radially outwardly. In the example illustrated, each inner bore 109a has an inner bore inlet 111a open to the inlet face 104, and an inner bore outlet 113a open to the outlet face 106 and offset radially outwardly from the inner bore inlet 111a.

In the example illustrated, the plurality of outer bores 109b direct flow of material radially inwardly. Each outer bore 109b has an outer bore inlet 111b open to the inlet face 104, and an outer bore outlet 113b open to the outlet face 106 and offset radially inwardly from the outer bore inlet 111b. In the example illustrated, the outer bore outlets 113b are arranged radially outward of the inner bore outlets 113a, and the outer bore inlets 111b are arranged radially outward of the inner bore inlets 111a.

In the example shown, the bores 108 are configured so that the flow of material passing through the static mixer 100 is generally helical. In the example illustrated, the bore outlet 112 is circumferentially offset from the bore inlet 110 for a given bore. In the example illustrated, each inner bore outlet 113a is offset from a respective inner bore inlet 111a in a first circumferential direction for directing flow of material in the first circumferential direction. Each outer bore outlet 113b is offset from a respective outer bore inlet 111b in a second circumferential direction opposite the first circumferential direction for directing flow of material in the second circumferential direction. In the example illustrated, the first circumferential direction is a counter-clockwise direction, and the second circumferential direction is a clockwise direction.

In alternative examples, the first circumferential direction may be a clockwise direction and the second circumferential direction may be a counter-clockwise direction. In alternative examples, the plurality of inner bores 109a may direct flow radially inwardly, and the plurality of outer bores 109b may direct flow of material radially outwardly.

In some examples, one or more of the bores, or portions thereof, may have a circular cross section. In other examples, one or more of the bores, or portions thereof, may have a non-circular (e.g., oval or oblong) cross section. In the example illustrated, each bore 108 has a circular cross-section. The bore inlets 110 and outlets 112 are open to sloped surfaces of the respective inlet and outlet faces, and have a generally non-circular (i.e. oblong) perimeter. In the example shown, the bore inlets 110 and bore outlets 112 have chamfered edges. In alternative examples, the bore inlets and/or bore outlets may have radiused edges or sharp edges.

Referring still to FIGS. 1 to 3, in the example shown, the inlet face 104 includes an inlet face peripheral portion 120, an inlet face central portion 122, and an inlet face annular recess 124 radially intermediate the inlet face peripheral portion 120 and the inlet face central portion 122. The inlet face peripheral portion 120 and inlet face central portion 122 are both generally planar and orthogonal to the longitudinal axis 107. In the example illustrated, the inlet face annular recess 124 is generally curved, and is recessed towards the outlet face 106. In the example shown, the inlet face annular recess 124 defines an inlet face recessed portion 125 of the inlet face 104. In the example illustrated, the inlet face recessed portion 125 makes up the entire portion of the inlet face 104 between the inlet face central portion 122 and the inlet face peripheral portion 120. When viewed in cross-section, the recessed portion 125 is recessed relative to an imaginary line extending between the radially outermost edge of the inlet face central portion 122 and the radially innermost edge of the inlet face peripheral portion 120.

Similarly, in the example shown, the outlet face 106 includes an outlet face peripheral portion 126, an outlet face central portion 128, and an outlet face annular recess 130 radially intermediate the outlet face peripheral portion 126 and the outlet face central portion 128. The outlet face peripheral portion 126 and outlet face central portion 128 are both generally planar and orthogonal to the longitudinal axis 107. In the example illustrated, the outlet face annular recess 130 is generally curved, and is recessed towards the inlet face 104. In the example shown, the outlet face annular recess 130 defines an outlet face recessed portion 131 of the outlet face 106. In the example illustrated, the outlet face recessed portion 131 makes up the entire portion of the outlet face 106 between the outlet face central portion 128 and the outlet face peripheral portion 126. When viewed in cross-section, the outlet face recessed portion 131 is recessed relative to an imaginary line extending between the radially outermost edge of the outlet face central portion 128 and the radially innermost edge of the outlet face peripheral portion 126.

In the example shown, the plate 102 includes a generally cylindrical core 132 that extends longitudinally between the inlet face central portion 122 and the outlet face central portion 128. In some examples, the core 132 may be generally solid. In the example illustrated, the core 132 is generally solid and integral with the plate 102. Each bore 108 may be spaced from the core 132, so that none of the bores 108 pass through the core 132. Each bore 108 is spaced radially outwardly from the core 132 in the example illustrated. In the example illustrated, each bore inlet 110 is open to the inlet face annular recess 124, and is spaced from the inlet face central portion 122. In the example illustrated, each bore outlet 112 is open to the outlet face annular recess 130, and is spaced from the outlet face central portion 128. Each bore 108 extends from the inlet face annular recess 124 to the outlet face annular recess 130 without passing through the core 132.

In some examples, the inlet face peripheral portion 120 may be axially spaced from the inlet face central portion 122, and the outlet face peripheral portion 126 may be axially spaced from the outlet face central portion 128. Referring to FIG. 3, in the example shown, the inlet face peripheral portion 120 is at a first axial position 134, and the inlet face central portion is at a second axial position 136 spaced from the first axial position 134. Furthermore, the outlet face peripheral portion 126 is at a third axial position 138, and the outlet face central portion 128 is at a fourth axial position 140 spaced from the third axial position 138. The second axial position 136 is spaced from the first axial position 134 in a direction of material flow, the third axial position 138 is spaced from the second axial position 136 in the direction of material flow, and the fourth axial position 140 is spaced from the third axial position 138 in the direction of material flow. The core 132 is axially offset from the inlet face peripheral portion 120 and the outlet face peripheral portion 126 in the direction of material flow.

Figure 4:
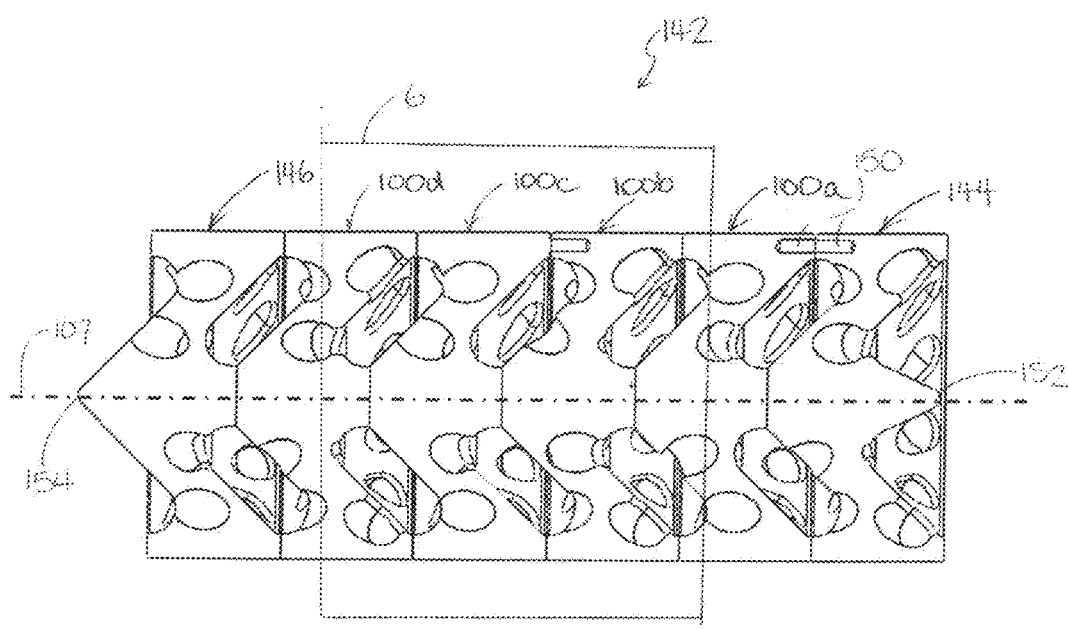
FIG. 4 is a cross-section taken through a static mixer assembly, including four of the static mixers of FIG. 1, an example outlet end static mixer, and an example inlet end static mixer.
Figure 5:
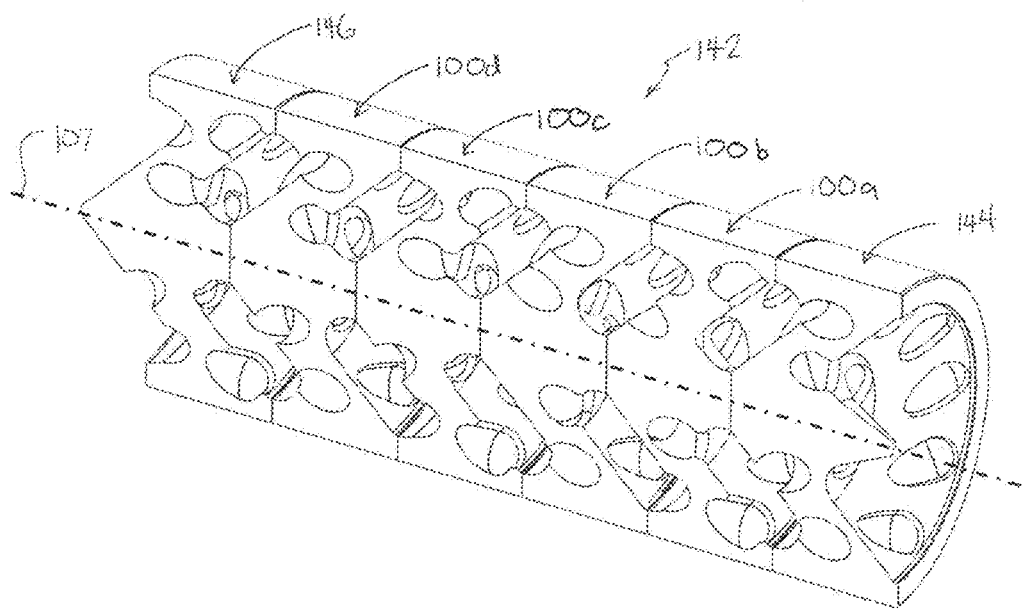
FIG. 5 is a perspective cutaway view of the static mixer assembly of FIG. 4.

In use, a plurality of static mixers 100 may be stacked to form a static mixer assembly. Referring to FIGS. 4 and 5, in the example shown, the static mixer assembly 142 includes four central static mixers 100a-100d, which are similar to each other and configured as described above with respect to FIGS. 1 to 3. The static mixer assembly 142 also includes an inlet end static mixer 144, and an outlet end static mixer 146.

In alternative examples, a static mixer assembly may include another number or configuration of static mixers. For example, a static mixer assembly may include only static mixers 100 as described above with respect to FIGS. 1 to 3 (i.e. without an inlet end static mixer 144 or an outlet end static mixer 146). Such an assembly may include two or more static mixers 100 as described above with respect to FIGS. 1 to 3. In some examples, a static mixer assembly may include an inlet end static mixer 144, a single central static mixer 100, and an outlet end static mixer 146. In some examples, a static mixer assembly may include only an inlet end static mixer 144 and an outlet end static mixer 146.

The stacking of static mixers 100b and 100c will presently be described with reference to FIGS. 6 and 7. The stacking of additional static mixers may be similar or identical to the stacking of static mixers 100b and 100c, and for simplicity, will not be described in detail herein. In the following description, the static mixer 100b may also be referred to as a "first static mixer 100b", and features of the first static mixer 100b may be referred to with the prefix "first" and/or the suffix "b". For example, the plate of the first static mixer 100b may be referred to as a "first plate 102b", and the plurality of bores of the first static mixer 100b may be referred to as a "first plurality of bores 108b". Similarly, the static mixer 100c may be referred to as a "second static mixer 100c", and features of the second static mixer 100c may be referred to with the prefix "second" and/or the suffix "c". For example, the plate of the second static mixer 100c may be referred to as a "second plate 102c", and the plurality of bores of the second static mixer 100c may be referred to as a "second plurality of bores 108c".

Figure 6:
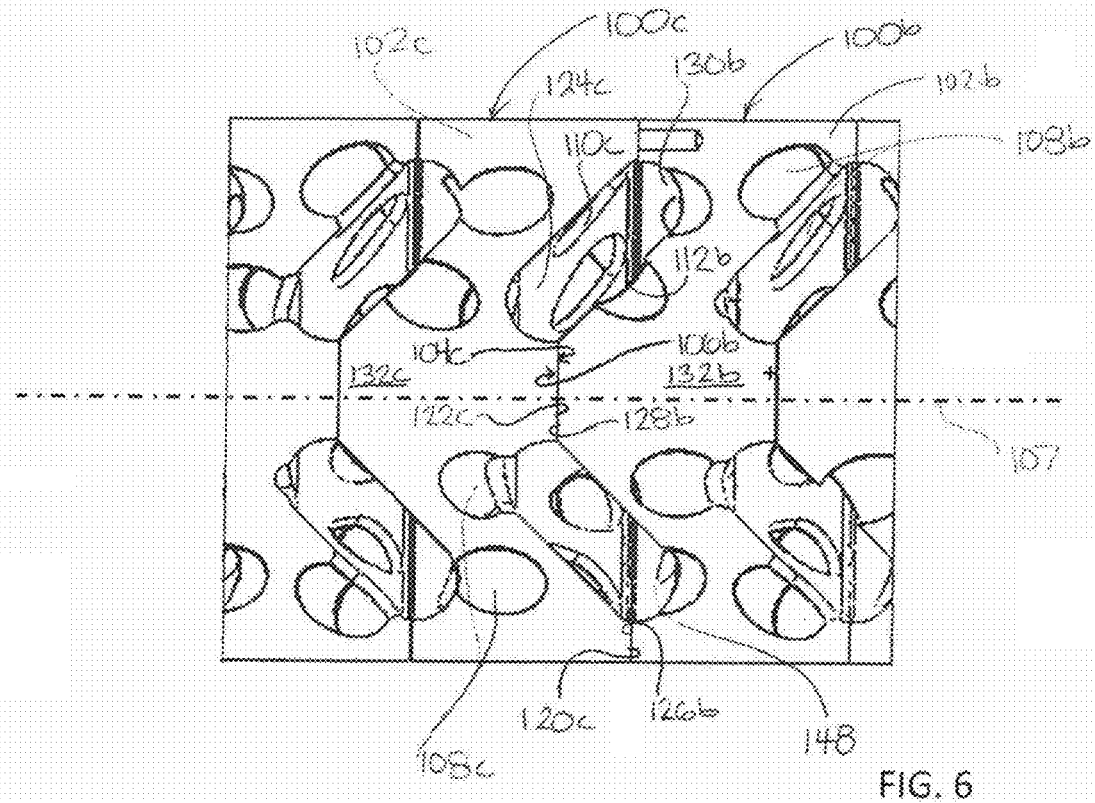
FIG. 6 is an enlarged view of the region shown in box 6 in FIG. 4.
Figure 7:
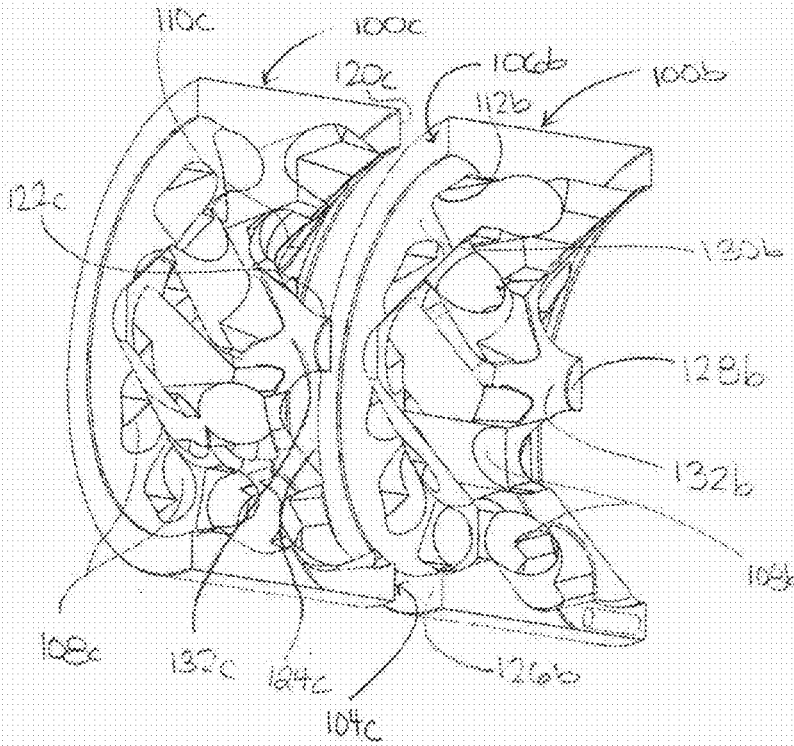
FIG. 7 is a perspective cutaway exploded view of two of the static mixers of FIG. 4.

Referring to FIGS. 6 and 7, in the example shown, the first plate 102b and the second plate 102c are stacked coaxially such that the outlet face 106b of the first plate 102b is adjacent the inlet face 104c of the second plate 102c. The inlet face peripheral portion 120c (also referred to as an inlet face peripheral abutment surface 120c) abuts the outlet face peripheral portion 126b (also referred to as an outlet face peripheral abutment surface 126b). Further, the inlet face central portion 122c (also referred to as an inlet face central abutment surface 122c) abuts the outlet face central portion 128b (also referred to as an outlet face central abutment surface 128b). The core 132c is coaxial with and abuts the core 132b. The central solid cores of each mixer 100 can enhance the strength of each mixer, and can enhance the strength and stability of the mixer assembly when the cores 132 of adjacent mixers are in abutment with each other.

In the example shown, the outlet face annular recess 130b and the inlet face annular recess 124c are positioned adjacent each other, and cooperate to form an annular chamber 148 between the first plate 102b and the second plate 102c. As the bore outlets 112b are open to the outlet face annular recess 130b, and the bore inlets 110c are open to the inlet face annular recess 124c, the first plurality of bores 108b and the second plurality of bores 108c are in fluid communication with the annular chamber 148 and with each other. In use, material passes from the first plurality of bores 108b into the annular chamber 148, and passes from the annular chamber 148 into the second plurality of bores 108c. When in the annular chamber 148, material from the first plurality of bores 108b may re-combine and mix, before passing into the second plurality of bores 108c.

Referring back to FIGS. 4 and 5, as material passes through the static mixer assembly 142 from static mixer to static mixer, the material is divided and separated as it passes into the bores of each successive plate, and mixed and recombined in each successive annular chamber. This can help mix, blend, shear, and/or homogenize the material passing through the static mixer assembly 142.

Referring still to FIGS. 4 and 5, any of the static mixers may be provided with one or more alignment bores 150 on a respective inlet face 104 and/or outlet face 106. An alignment bore 150 of a given static mixer may be aligned with an alignment bore 150 of an adjacent static mixer, and an alignment pin may be provided in the two alignment bores 150, for maintaining the static mixers in a fixed rotational position. When the static mixers are in the fixed rotational position, each bore outlet 112b of the first plate 102b may be at a circumferential position that is between two adjacent bore inlets 110c of the successive second plate 102c. Material passing from the first static mixer 100b to the second static mixer 100c may, when exiting a bore outlet 112b of the first static mixer 100b be divided into two flow streams that enter adjacent second bore inlets 110c of the second static mixer 100c.

Referring still to FIGS. 4 and 5, as mentioned above, the static mixer assembly 142 also includes an inlet end static mixer 144, and an outlet end static mixer 146. The inlet end static mixer 144 includes an inlet face central portion 152 that is generally pointed, to facilitate flow of material into the inlet end static mixer 144. The outlet end static mixer 146 includes an outlet face central portion 154 that is generally pointed, to facilitate flow of material out of the outlet end static mixer 146.

While the above description provides examples of one or more processes or apparatuses, it will be appreciated that other processes or apparatuses may be within the scope of the accompanying claims.

The invention claimed is:

1. A static mixer for mixing injection material in an injection molding machine, the static mixer comprising:
   a) a plate having an inlet face, an axially opposed outlet face, and a longitudinal axis extending therebetween; and
   b) a plurality of bores extending through the plate from the inlet face to the outlet face, each bore extending along a bore axis between a bore inlet and a bore outlet, the bore axis inclined relative to the longitudinal axis;
   c) the inlet face comprising an inlet face peripheral portion at a first axial position, and an inlet face central portion at a second axial position spaced from the first axial position;
   d) the outlet face comprising an outlet face peripheral portion at a third axial position, and an outlet face central portion at a fourth axial position spaced from the third axial position; and
   e) the plate having a core extending longitudinally between the inlet face central portion and the outlet face central portion, the inlet face central portion of the plate generally formed by a leading endface of the core and the outlet face central portion generally formed by an opposed trailing endface of the core, the core generally cylindrical in cross-section between the leading and trailing endfaces and inhibiting flow of injection material through a radially central portion of the plate extending axially from the inlet endface to the outlet endface, and wherein each bore including the respective bore inlet and bore outlet, is spaced radially outwardly from the core.

2. The static mixer of claim 1, wherein the inlet face comprises an inlet face annular recess radially intermediate the inlet face peripheral portion and the inlet face central portion, the inlet face annular recess comprising a first generally concave depression encircling the core.

3. The static mixer of claim 2, wherein each bore inlet is open to the inlet face annular recess.

4. The static mixer of claim 3, wherein the outlet face comprises an outlet face annular recess radially intermediate the outlet face peripheral portion and the outlet face central portion, the outlet face annular recess comprising a second generally concave depression encircling the core.

5. The static mixer of claim 4, wherein each bore outlet is open to the outlet face annular recess.

6. The static mixer of claim 1, wherein the inlet face peripheral portion is spaced axially upstream of the inlet face central portion, and the outlet face peripheral portion is spaced axially upstream of the outlet face central portion.

7. The static mixer of claim 6, wherein the inlet face central portion is spaced axially upstream of the outlet face peripheral portion.

8. The static mixer of claim 1, wherein the plurality of bores includes a plurality of first bores extending linearly along respective first bore axes and a plurality of second bores extending linearly along respective second bore axes, wherein the first bores are arranged in a first ring around the longitudinal axis, and the second bores are arranged in a concentric second ring around the longitudinal axis.

9. The static mixer of claim 8, wherein the first bore axes of the first bores are inclined at a first angle relative to the longitudinal axis, and the second bore axes of the second bores are inclined at a second angle relative to the longitudinal axis, the second angle different from the first angle.

10. The static mixer of claim 9, wherein the first bore axes diverge away from the longitudinal axis from the first bore inlets to the first bore outlets to direct flow radially outwardly, and the second bore axes converge towards the longitudinal axis from the second bore inlets to the second bore outlets to direct flow radially inwardly.

11. The static mixer of claim 10, wherein the second bore outlets are radially outward of the first bore outlets, and the second bore inlets are radially outward of the first bore inlets.

12. The static mixer of claim 9, wherein each first bore axis diverges in a first orthogonal direction away from a respective first plane containing the longitudinal axis and the respective bore inlet to direct flow in a first circumferential direction, and each second bore axis diverges in a second orthogonal direction away from a second respective plane containing the longitudinal axis and the respective bore inlet and opposite the first orthogonal direction to direct flow in a second circumferential direction opposite the first circumferential direction.

13. The static mixer of claim 1, wherein the inlet face central portion and the inlet face peripheral portion are generally planar and orthogonal to the longitudinal axis.

14. The static mixer of claim 1, wherein the outlet face central portion and the outlet face peripheral portion are generally planar and orthogonal to the longitudinal axis.

15. A static mixer for an injection molding machine, the static mixer comprising:
   a) a plate having an inlet face, an axially opposed outlet face, and a core extending along a longitudinal axis therebetween, the inlet face comprising an inlet face annular recess, and the outlet face comprising an outlet face annular recess, wherein the inlet face annular recess comprises a first generally concave depression in the inlet face and encircling a core inlet end of the core protruding axially outward relative to the first depression, and the outlet face annular recess comprises a second generally concave depression in the outlet face and encircling a core outlet end of the core protruding axially outward relative to the second depression; and
   b) a plurality of bores extending through the plate, each bore extending along a bore axis between a bore inlet open to the inlet face annular recess and a bore outlet open to the outlet face annular recess, each bore axis inclined relative to the longitudinal axis.

16. The static mixer of claim 15, wherein the inlet face comprises an inlet face peripheral portion, and an inlet face central portion, the inlet face central portion comprising a leading endface of the core inlet end of the core, and the inlet face annular recess radially intermediate the inlet face peripheral portion and the inlet face central portion.

17. The static mixer of claim 16, wherein the inlet face central portion and the inlet face peripheral portion are generally planar and orthogonal to the longitudinal axis.

18. The static mixer of claim 17, wherein the outlet face comprises an outlet face peripheral portion, and an outlet face central portion, the outlet face central portion comprising a trailing endface of the core outlet end of the core, and the outlet face annular recess radially intermediate the outlet face peripheral portion and the outlet face central portion.

19. The static mixer of claim 18, wherein the outlet face central portion and the outlet face peripheral portion are generally planar and orthogonal to the longitudinal axis.

20. A static mixer for an injection molding machine, the static mixer comprising:
   a) a plate having an inlet face, an axially opposed outlet face, and a longitudinal axis extending between the inlet face and the outlet face;
   b) a plurality of radially inner bores extending through the plate for directing flow of material radially outwardly, each inner bore having an inner bore inlet open to the inlet face and an inner bore outlet open to the outlet face and offset radially outwardly from the inner bore inlet; and
   c) a plurality of radially outer bores extending through the plate for directing flow of material radially inwardly, each outer bore having an outer bore inlet open to the inlet face and an outer bore outlet open to the outlet face and offset radially inwardly from the inner bore inlet, the outer bore outlets arranged radially outward of the inner bore outlets.

21. The static mixer of claim 20, wherein each inner bore outlet is offset from a respective inner bore inlet in a first circumferential direction for directing flow of material in the first circumferential direction, and each outer bore outlet is offset from a respective outer bore inlet in a second circumferential direction opposite the first circumferential direction for directing flow of material in the second circumferential direction.

22. The static mixer of claim 21, wherein the inner bores are arranged in a first ring about the axis, and the outer bores are arranged in a second ring about the axis, the second ring concentric with and radially outward of the first ring.

* * * * *